United States Patent [19]

Fritsch

[11] 4,367,656
[45] Jan. 11, 1983

[54] SINGLE AXIS FORCE TRANSDUCER

[75] Inventor: Joseph E. Fritsch, Oak Park, Mich.

[73] Assignee: Massey-Ferguson Inc., Detroit, Mich.

[21] Appl. No.: 211,595

[22] Filed: Dec. 1, 1980

[51] Int. Cl.³ .............................................. G01L 1/22
[52] U.S. Cl. ................... 73/862.65; 73/782; 73/862.57
[58] Field of Search ........... 73/862.56, 862.57, 862.65, 73/862.66, 862.67, 775, 781, 782, 767, 855; 338/5, 6; 177/211

[56] References Cited

U.S. PATENT DOCUMENTS

| 2,503,304 | 4/1950  | Stainback.           |
|-----------|---------|----------------------|
| 2,597,751 | 5/1952  | Ruge.                |
| 2,814,946 | 12/1957 | Harris, Jr. ........... 73/862.65 |
| 3,004,231 | 10/1961 | Laimins.             |
| 3,093,999 | 6/1963  | Dahle et al.         |
| 3,135,112 | 6/1964  | Farley.              |
| 3,136,154 | 6/1964  | Christensen.         |
| 3,161,046 | 12/1964 | Farley.              |
| 3,246,701 | 4/1966  | Schulz.              |
| 3,411,361 | 11/1968 | McLellan.            |
| 3,447,367 | 6/1969  | Taylor.              |
| 3,602,866 | 8/1971  | Saxl.                |
| 3,621,437 | 11/1971 | Mading.              |
| 3,638,481 | 2/1972  | Wilner.              |
| 3,736,795 | 6/1973  | Andersson.           |
| 3,772,912 | 11/1973 | Andersson.           |
| 3,782,182 | 1/1974  | Starr.               |
| 3,855,857 | 12/1974 | Claycomb ........... 73/862.04 |
| 3,911,737 | 10/1975 | Ormond.              |
| 3,969,935 | 7/1976  | Shoberg.             |
| 3,995,696 | 12/1976 | Kainer et al.        |
| 4,047,144 | 9/1977  | Wong.                |
| 4,128,001 | 12/1978 | Marks.               |
| 4,143,727 | 3/1979  | Jacobson.            |
| 4,165,637 | 8/1979  | Kooman.              |
| 4,171,646 | 10/1979 | Dybel et al.         |
| 4,181,011 | 1/1980  | Brendel.             |
| 4,203,318 | 5/1980  | Yorgiadis ........... 73/862.65 |

FOREIGN PATENT DOCUMENTS 2424487  11/1975  Fed. Rep. of Germany ... 73/862.65

Primary Examiner—Charles A. Ruehl
Attorney, Agent, or Firm—John C. Thompson

[57] ABSTRACT

A transducer for sensing forces in a single axis. A beam (14) which may be the draft link of a tractor is provided with an intermediate central beam (32) defined by two relatively narrow parallel slots (30) disposed closely adjacent to the neutral plane (34) of the beam (14). The central beam (32) is provided with a reduced cross sectional area (44) which acts to mechanically amplify tensile and compressive loads applied along the axis of the beam. Strain sensing means, which may be strain gauges, are associated with the reduced cross sectional area. The slots (30) and reduced cross sectional area are formed by wire electro discharge machining.

4 Claims, 7 Drawing Figures

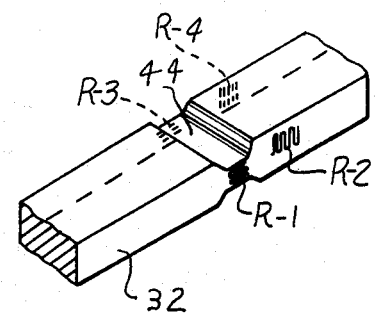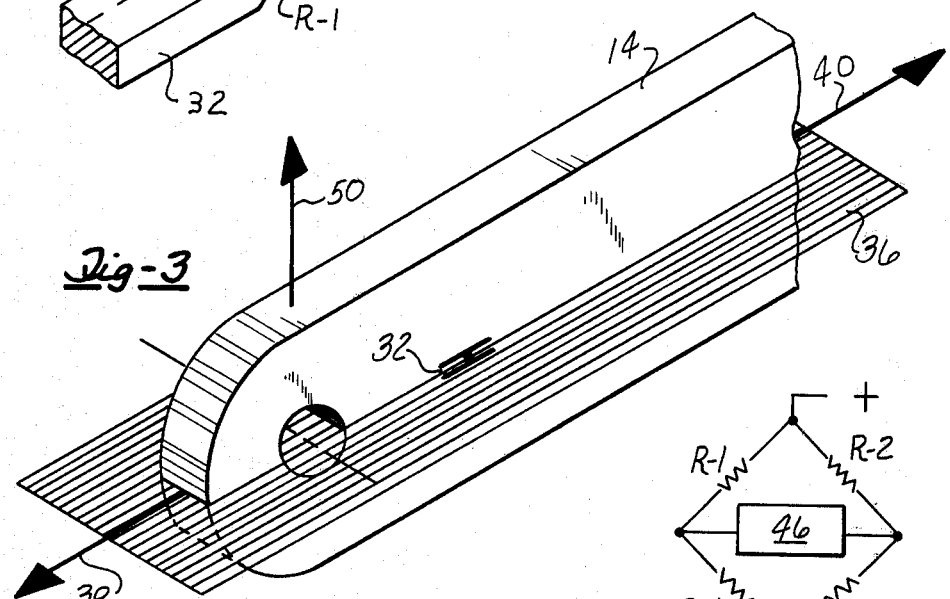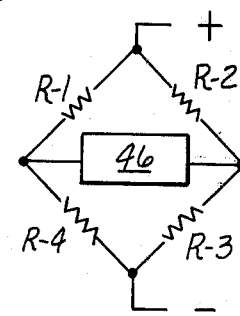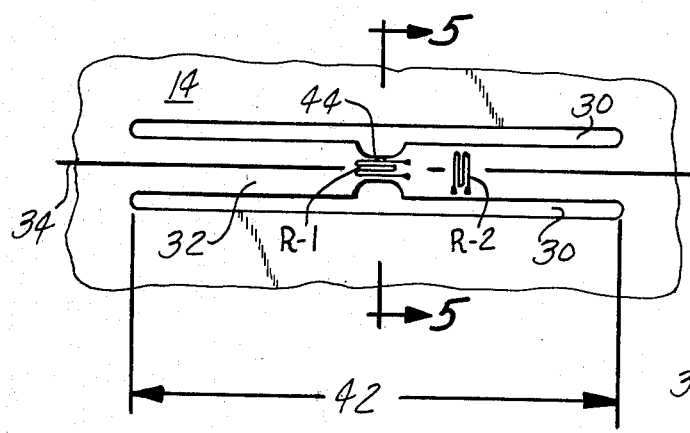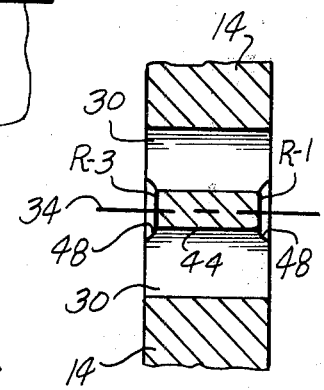

SINGLE AXIS FORCE TRANSDUCER

TECHNICAL FIELD

The present invention relates generally to force transducers, and more particularly to a single axis force transducer of novel construction which can be used for sensing the draft load on a tractor.

BACKGROUND

Single axis force transducers are well known and are used in many situations in measuring or monitoring a load or force. When a structural member, such as that used for tractor lower draft links, is subjected to an axial force, the elastic deformation of the structural member can be measured by using bonded metallic resistance strain gauges to determine the magnitude of the force. For higher accuracy the strain gauge sensitivity can be increased by reducing the cross sectional area of the structural member in the strain gauge location.

When the structural member is subjected to a bending force, in additional to an axial force, such as in a tractor lower draft link, reducing the cross sectional area becomes more difficult and is generally a trade-off between transducer sensitivity and structural integrity. Unfortunately, the elastic deformation, due to bending, is several times greater than that due to tensile load, and therefore cross sensitivity of transverse forces, which are perpendicular to the axis of the structural member, introduces substantial error into the output signal.

In the past, the most common method of increasing the transducer sensitivity was by boring an aperture of substantial cross section through the central portion of the lower draft links as shwon in U.S. Pat. No. 3,246,701 issued April, 19, 1966. While this method does increase the sensitivity in the longitudinal axis of the lower draft links, it also increases the cross sensitivity of the transucer. For example, if the aperture in the lower draft link is between the tractor lift link and the implement secured to the lower draft link, and if an upwardly extending force is applied to the lift link in addition to the tensile force in the longitudinal direction of the lower draft link, material above the aperture will experience tensile stress, while the material below the aperture may experience compressive stress. An additional disadvantage of the aforementioned patent is that in order to achieve good sensitivity for tensile and compressive forces applied along the longitudinal axis of the lower draft link it is necessary to provide an aperture of relatively large diameter. This will materially reduce the strength of the lower draft links when bending loads are applied to the links.

The amount of resistance change to the strain gauge circuit, due to cross sensitivity, is dependent on the amount of force and the location of the strain gauge in relation to the neutral axis of the lower link in that plane. As a general rule, the further from the neutral axis that the strain gauge is located, the higher the stress that the strain gauge will experience.

In theory the strain gauge circuit can be designed so that the strain gauge resistance change, resulting from forces perpendicular to the axial or measuring direction, tend to offset each other and no net changes in bridge output is generated. However, this requires extreme accuracy in both machining and strain gauge placement. In some cases the only practical method of nullifying the extraneous signals is by using eight or more strain gauges instead of the usual four in the bridge circuit. Another element method used to isolate the force measuring element from side forces is to incorporate diaphragms or flexure webs connected to the force measuring element. Since such flexural supports not only take up side forces, but also part of the force to be measured, they have a negative influence on the measuring accuracy. These flexural supports also require precise machining.

OBJECTS AND SUMMARY OF THE INVENTION

It is the principal object of the present invention to provide a single axis force transducer which has both a high signal and high structural strength.

It is a further object of the present invention to provide a single axis force transducer having a principal longitudinally extending beam provided with an intermediate central beam defined by two relatively narrow longitudinally extending parallel slots, the intermediate central beam being provided with means for mechanically amplifying tensile and compressive loads, and in which strain sensing means are associated with the means for mechanically amplifying the loads.

It is a further object of the present invention to provide a method for forming a single axis force transducer of the type set forth.

It is an additional object of the present invention to provide a draft sensing apparatus for a tractor of the type having a pair of lower draft links connected to the tractor, each of the lower draft links being a single axis force transducer of the type set forth, the tractor further being provided with means to raise and lower the lower draft links, and control means capable of summing the forces measured by the lower draft links for causing the lower draft links to be raised or lowered in accordance with predetermined criteria.

The foregoing objects and other objects and advantages of the present invention as well as the structure required to accomplish various objects will become more apparent after a consideration of the following detailed description taken in conjunction with the accompanying drawings and which a preferred form of this invention is illustrated.

BRIEF DESCRIPTION OF THE FIGURES

FIG. 3 is an enlarged view of a portion of one of the lower links associated with the tractor illustrated in FIG. 1.

FIG. 4 is an enlarged side view of a portion of the lower link illustrated in FIG. 3.

FIG. 5 is a section taken generally along the line 5—5 in FIG. 4.

FIG. 6 is an enlarged perspective view of a portion of the lower link shown in FIG. 3 showing the location at which strain gauges may be mounted on the link.

FIG. 7 shows the strain gauge bridge circuit.

DETAILED DESCRIPTION

Figure 1:
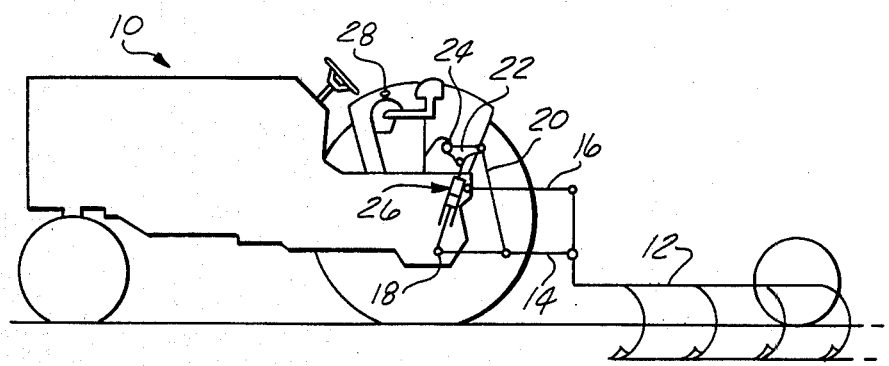
FIG. 1 is an outline of a tractor, hitch and implement combination on which this invention can be applied.

Referring now to FIG. 1, a tractor, indicated generally at 10, is shown interconnected with a semimounted implement such as a plow 12 by a conventional three point hitch including a pair of lower draft links 14 (only one of which is shown) and an upper link 16. The forward ends of the links 14 are secured to the tractor at 18 for articulated movement. The forward end of the upper link 16 is also secured to the tractor for swinging movement. The lower links may be raised and lowered by means of lift links 20, the upper ends of which are connected to lift arms 22 which are in turn secured to a rockshaft 24. The lift arms can be moved upwardly and downwardly by a single acting hydraulic cylinder 26. The position of the hydraulic cylinder is controlled by a valve assembly (indicated generally at 27 in FIG. 2) which causes fluid to be maintained in the cylinder, to be introduced into the cylinder, or to be vented from the cylinder in response to various command and feedback signal. Thus, the tractor operator may set a draft command signal through movement of the control lever 28. A draft feedback signal is initiated by the single axis force transducer of this invention and this, in combination with the draft command signal will cause the valve assembly 27 to be shifted into the position were fluid is maintained within the cylinder 26 once the desired draft has been attained. The operation of the circuit illustrated in FIG. 2 will be more fully described below.

Each of the lower draft links can be considered as a single axis force transducer. The link or transducer 14 has two relatively narrow longitudinally extending parallel slots 30 machined through the link, which can also be considered to be a longitudinally extending principal beam. The machining is done preferably by wire electro discharge machining (EDM). The slots define a central beam 32 which is located between the slots 30. The longitudinal axis 34 of the central beam follows the longitudinal neutral axis or plane 36 of the tractor lower draft link. Thus, it should be apparent that the relatively narrow slots 30 are also parallel to the neutral axis 36 of the lower draft link and are equally spaced apart on opposite sides of this axis.

When the principal beam or lower draft link 14 is subjected to a force in a direction parallel to the longitudinal axis 34, as for example by a tensile force indicated by arrow 38, or by a compression force indicated by arrow 40, the total elastic deformation of the beams 14 and 32 are the same over the distance 42. Thus, the central beam 32 has the same total elastic deformation as a structural section 14 over the distance 42.

According to the principles of this invention, the central beam 32 contains a reduced cross sectional area 44 located in the central portion of the beam. Therefore, when the lower draft link 14 is subjected to a force 38 or 40, the elastic deformation is not uniform over the entire length of the central beam 32, and almost all of the strain in distance 42 will be concentrated in the reduced cross sectional area 44. The gain in amplification is a function of the ratio of distance 42 to the length of the reduced cross sectional area 44.

The reduced cross sectional area can be considered as a means for mechanically amplifying tensile and compressive loads. Strain sensing means are associated with the reduced cross sectional area 44. The strain sensing means are preferably strain gauges of the resistive variety, however, other strain sensing means may be utilized such as capacitive sensors, LVDT's, sensing elements incorporating polorized light, and other strain sensing elements known to the art. The strain gauges R-1, R-2, R-3, and R-4 are shown in a typical bridge circuit in FIG. 7 with the output being indicated at 46. Strain gauges R-1 and R-3 are oriented to measure the tensile or compressive strain, and strain gauges R-2 and R-4 are oriented 90 degrees to these strains. FIG. 6 shows the location of these strain gauges on the central beam 32.

If protection is needed for the strain gauges R-1 and R-3 an undercut, such as that indicated at 48 in FIG. 5, can be used with the strain gauges being mounted in the undercut. In addition, a groove (not shown) can be milled in the draft link 14 for the lead wires. After the strain gauges and lead wires are located in the undercut and the groove, the undercut, the two parrallel slots 30, and the groove, may be filled with a flexible protective material.

It should be appreciated from the avove structure, that when a bending load is applied, as for example in the direction indicated by arrow 50, that there will be only a minimal output from the strain gauges R-1 and R-3 since the strain gauges are centrally located on the neutral axis of the central beam 32. It should also be appreciated that the mechanical amplification is a function of the ratio of the length of the central beam 32 to the length of the reduced cross sectional area 44, thus reducing the size of the machined portion of the transducer, in order to increase the structural strength of the lower draft link, would not affect the mechanical amplification.

Figure 2:
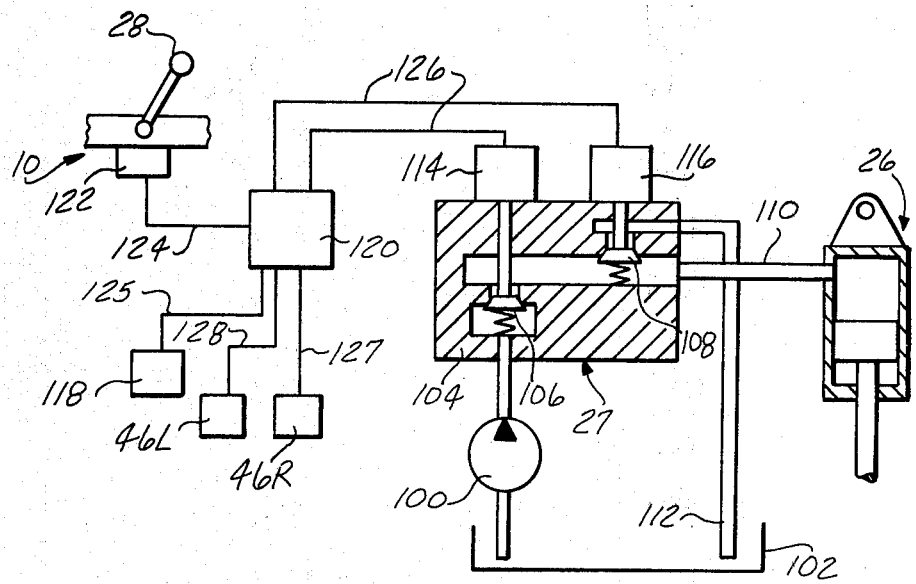
FIG. 2 is a schematic view illustrating a hydraulic and electrical circuit which may be associated with this invention.

Referring now to FIG. 2, an electrical hydraulic system as illustrated in which this invention may be utilized. The hydraulic system includes, in addition to the valve 27 and the hydraulic cylinder assembly 26, a pump 100 and a reservoir 102: the valve includes a valve body 104 in which are mounted two poppet valves 106 and 108. Poppet valve 106 controls the flow of fluid from the pump to cylinder assembly 26 through hydraulic line 110. Similarly, poppet 108 controls the flow of fluid from the cylinder 26 to sump 102 through hydraulic line 112. It should be apparent from FIG. 2 that when both poppet valves are closed fluid will be maintained in the cylinder assembly 26. Two solenoid actuators 114, 116 are shown mounted upon the valve body 104, actuator 114 being associated with poppet 106 and actuator 116 being associated with poppet 108.

The electrical cireucit includes, in addition to the two solenoids 114 and 116, output 46R from the right hand lower draft link bridge circuit, output 46L from the left hand lower draft link bridge circuit, a power supply 118, a signal summer and processor 120, and a command signal generator 122 as well as various leads 124, 125, 126, 127, and 128. The manual control 28 is mounted on a portion of the tractor 10 and is interconnected with the command signal generator 122. As the control circuit shown in FIG. 2 is not, per se, a feature of this invention, it will not be described in detail. However, it should be noted that during the operation of the tractor, that the stresses in the right and left hand lower draft links 14 will be summed in the processor 120 and compared with the command signal from generator 122, which in turn may cause one or the other of the solenoids 114, 116 to be operated.

While a preferred embodiment has been disclosed above, it is to be understood that the invention is not to be limited to the above embodiment as various alternative embodiments will occur to those having ordinary skill in the art.

what is claimed is:

1. A single axis force transducer comprising:
   an integral homogeneous longitudinally extending principal beam having opposed generally parallel sidewalls and subject to bending loading transverse to its neutral axis and subject to tensile and compressive loading parallel to its neutral axis, said principal beam being provided with an intermediate central beam defined by two reltively narrow parallel longitudinally extending slots extending through the principal beam from one of said sidewalls to the other of said sidewalls, said central beam being provided with means for mechanically amplifying tensile and compressive loads applied to the principal beam, and strain sensing means associated with said means for mechanically amplifying loads.

2. the single axis force transducer set forth in claim 1 wherein the two longitudinally extending parallel relatively narrow slots are disposed substantially equal distances to either side of the longitudinally extending neutral axis of the principal beam.

3. The single axis force transducer set forth in claim 1 wherein the means for mechanically amplifying tensile and compressive loads is a reduced cross sectional area in the central beam.

4. The single axis force transducer set forth in claim 1 or claim 3 wherein the strain sensing means includes a plurality of strain gauges, at least a pair of which are bonded securely to the means for mechanically amplifying tensile and compressive loads.

* * * * *